United States Patent
Jain et al.

(10) Patent No.: US 12,432,413 B2
(45) Date of Patent: Sep. 30, 2025

(54) MULTI-DWELLING UNIT (MDU)-GROUP RECORDING

(71) Applicant: DISH Network Technologies India Private Limited, Karnataka (IN)

(72) Inventors: Himanshu Jain, Karnataka (IN); Laxminarayana Dalimba, Karnataka (IN); Nishit Dabi, Karnataka (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 135 days.

(21) Appl. No.: 18/357,839

(22) Filed: Jul. 24, 2023

(65) Prior Publication Data

US 2025/0039495 A1    Jan. 30, 2025

(51) Int. Cl.
*H04H 60/32*    (2008.01)
*H04N 21/433*    (2011.01)
*H04N 21/442*    (2011.01)
*H04N 21/45*    (2011.01)
*H04N 21/466*    (2011.01)
*H04N 21/482*    (2011.01)

(52) U.S. Cl.
CPC ... *H04N 21/4334* (2013.01); *H04N 21/44204* (2013.01); *H04N 21/4532* (2013.01); *H04N 21/4668* (2013.01); *H04N 21/4826* (2013.01)

(58) Field of Classification Search
CPC ......... H04N 21/4334; H04N 21/44204; H04N 21/4532; H04N 21/4668; H04N 21/4826
See application file for complete search history.

(56) References Cited

U.S. PATENT DOCUMENTS

| | | | |
|---|---|---|---|
| 8,156,246 B2 | 4/2012 | Short et al. | |
| 8,621,530 B1 | 12/2013 | Guzman et al. | |
| 9,800,927 B2 * | 10/2017 | Chai | H04N 21/44218 |
| 11,126,939 B2 | 9/2021 | Mappus et al. | |
| 2008/0097858 A1 | 4/2008 | Vucina et al. | |

(Continued)

FOREIGN PATENT DOCUMENTS

WO    2013/142967 A1    10/2013

OTHER PUBLICATIONS

"Home Gateway Technical Requirements: Residential Profile," Home Gateway Initiative, Apr. 29, 2008, pp. 1-125, XP055121004.

*Primary Examiner* — Gigi L Dubasky
(74) *Attorney, Agent, or Firm* — Kilpatrick Townsend & Stockton LLP

(57) ABSTRACT

Methods, systems, and devices for group recording are provided. In one example, a method includes: obtaining viewership data related to users of a multiple-dwelling unit (MDU), processing the viewership data to generate at least one user list that includes one or more common characteristics shared by the plurality of users, identifying at least one target content item, based on the one or more common characteristics for the at least one user list, determining at least one target recording item for group recording, based on the at least one target content item, automatically performing group recording of the at least one target recording item to correspondingly generate at least one shared recording, storing a copy of each shared recording in a storage device, and providing access to the content of the shared recording to a user of the MDU upon request by the user.

20 Claims, 8 Drawing Sheets

(56) References Cited

U.S. PATENT DOCUMENTS

| | | | |
|---|---|---|---|
| 2009/0178071 A1* | 7/2009 | Whitehead | H04M 1/2746 |
| | | | 725/15 |
| 2010/0251305 A1* | 9/2010 | Kimble | H04N 7/17318 |
| | | | 725/46 |
| 2011/0225608 A1* | 9/2011 | Lopatecki | H04N 21/2668 |
| | | | 725/34 |
| 2011/0293277 A1 | 12/2011 | Bradea | |
| 2012/0079548 A1* | 3/2012 | Whitten | H04N 21/442 |
| | | | 725/115 |
| 2014/0068692 A1 | 3/2014 | Archibong et al. | |
| 2014/0089182 A1 | 3/2014 | Short et al. | |
| 2014/0244648 A1 | 8/2014 | Wyatt et al. | |
| 2014/0244778 A1 | 8/2014 | Wyatt | |
| 2015/0089523 A1* | 3/2015 | Volovich | H04N 21/44226 |
| | | | 725/14 |
| 2017/0094356 A1 | 3/2017 | Mathews et al. | |
| 2017/0272196 A1 | 9/2017 | Davidson | |
| 2019/0268633 A1 | 8/2019 | Jayawardene | |
| 2019/0268762 A1 | 8/2019 | Bestermann et al. | |
| 2019/0303562 A1 | 10/2019 | Masputra | |
| 2020/0236414 A1 | 7/2020 | Rhoads et al. | |
| 2020/0310735 A1 | 10/2020 | Dean-Bhiyan et al. | |
| 2022/0417310 A1 | 12/2022 | Thaw et al. | |
| 2023/0144753 A1 | 5/2023 | Jayawardene | |
| 2023/0179827 A1 | 6/2023 | Coburn, IV et al. | |
| 2023/0205904 A1* | 6/2023 | Hassan | G06Q 10/10 |
| | | | 726/26 |
| 2023/0217059 A1 | 7/2023 | D'Amato et al. | |

\* cited by examiner

MULTI-DWELLING UNIT (MDU)-GROUP RECORDING

BACKGROUND OF THE DISCLOSURE

There are a number of ways to handle recording of live content on a DVR or similar device. For example, each user that has recorded some particular content may have their own separate copy of that content. For example, if two users are recording the same program airing at the same time, then two separate copies of the content would be recorded for each user, respectively. Then, each of the unique recordings may be served to the users individually upon request.

Storing unique copies of a recording for each individual user in a multi-dwelling unit (MDU) can be challenging because a large number of unique copies can quickly consume a lot of storage space. Each unique copy of the recording requires its own storage space, which can add up quickly if there are a large number of users in the MDU. This can be a significant problem for MDUs that have limited storage space available. If the storage space fills up quickly, it may be necessary to either delete old recordings or purchase additional storage space, which can be costly and complicated to manage.

BRIEF SUMMARY OF THE DISCLOSURE

In accordance with some embodiments of the present disclosure, a method is provided. In one example, a method includes: obtaining viewership data related to users of a multiple-dwelling unit (MDU), processing the viewership data to generate at least one user list, the at least one user list including user identities of a plurality of users of the MDU and one or more common characteristics shared by the plurality of users, identifying at least one target content item, based on the one or more common characteristics for the at least one user list, determining at least one target recording item for group recording, based on the at least one target content item, automatically performing group recording of the at least one target recording item to correspondingly generate at least one shared recording, storing a copy of each shared recording in a storage device, and providing access to the content of the shared recording to a user of the MDU upon request by the user. The method may be implemented by a computer device or system.

In accordance with some embodiments of the present disclosure, a MDU gateway device is provided. In one example, the MDU gateway device includes: one or more processors and a computer-readable storage media storing computer-executable instructions. The computer-executable instructions, when executed by the one or more processors, cause the MDU gateway device to: receive viewership data related to users of an MDU, process the viewership data to generate at least one user list, the at least one user list including user identities of a plurality of users of the MDU and one or more common characteristics shared by the plurality of users, identify at least one target content item, based on the one or more common characteristics for the at least one user list, determine at least one target recording item for group recording, based on the at least one target content item, automatically perform group recording of the at least one target recording item to correspondingly generate at least one shared recording, store a copy of each shared recording in a storage device, and provide access to the copy of the shared recording to a user of the MDU upon request by the user.

In accordance with some embodiments, the present disclosure also provides a non-transitory machine-readable storage medium encoded with instructions, the instructions executable to cause one or more electronic processors of a system to: receive viewership data related to users of an MDU, process the viewership data to generate at least one user list, the at least one user list including user identities of a plurality of users of the MDU and one or more common characteristics shared by the plurality of users, identify at least one target content item, based on the one or more common characteristics for the at least one user list, determine at least one target recording item for group recording, based on the at least one target content item, automatically perform group recording of the at least one target recording item to correspondingly generate at least one shared recording, store a copy of each shared recording in a storage device, and provide access to the copy of the shared recording to a user of the MDU upon request by the user.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE DISCLOSURE

The present disclosure provides devices, systems, and methods for group recording of content for multiple users of an MDU. One insight provided in the present disclosure is that a single copy of the recorded content may be shared among multiple users of the same MDU. For example, two users have recorded the same program airing at the same time; however, instead of recording individual copies of the content for each user, a single shared copy is recorded for subsequent access by the users upon request. Thus, the single copy may save storage space in the process.

Another insight provided by the present disclosure is that a head end or a centralized set top box (i.e., the MDU gateway device 160) may be provided for an MDU. The MDU gateway device may be used to predict a target content item and a target recording item, perform group recording of the target content item to generate a single copy of shared recording, and distribute the content of the shared recording to multiple users within the MDU. This content recorded on the MDU gateway device may be restricted from leaving the premises of the MDU. For example, the content may not be allowed to be stored on a cloud service or the like off the premises of the MDU. This may be governed by an agreement between the content provider and content distributer. Compared with the conventional method, the group recording according to the present disclosure could effectively reduce the redundant copies the same recorded content, significantly reduce the usage of the storage space, and improve the overall efficiency of recording management for the MDU.

A further insight provided in the present disclosure is that machine learning models may be developed and used to intelligently and reliably predict common characteristics of MDU users, predict a target content item based on the common characteristics, and prioritize the target content items to be recorded to maximize the usage of the storage space. In addition, a management portal may be provided to an MDU administrator (e.g., the property or premises manager of the MDU) to allow the MDU administrator to review, modify, approve, and delete the target content items predicted by the MDU gateway device to be in line with the users' need and further improve the user experience and satisfaction.

Figure 1:
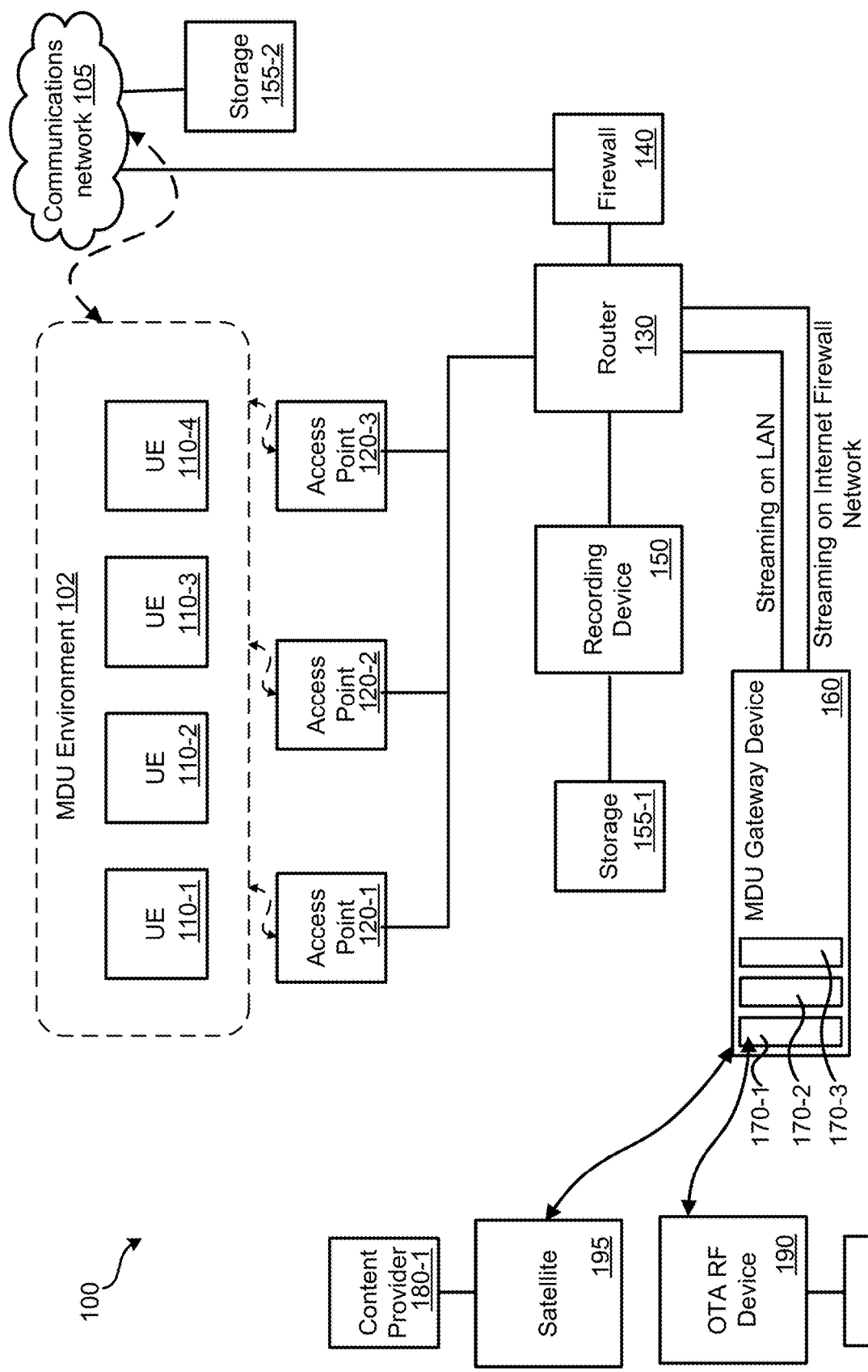
FIG. 1 is a schematic diagram illustrating an example of a communications system according to various embodiments.

FIG. 1 is a schematic diagram illustrating an example of a communications system 100 (also referred to as "system 100") according to various embodiments. In the illustrated example, the system 100 includes, among other components, multiple UEs 110 in a MDU environment 102 (also referred to as "MDU 102"), a communications network, multiple access points 120, a MDU gateway device 160, a recording device 150, a storage device 155, a router 130, and a firewall 140.

The MDU 102 used here in refer to a residential building or complex that contains multiple compartments or separate living units within a single structure. Examples of MDUs include apartment buildings consisting of multiple individual apartments within a single building, condominiums in which individual units are owned by their occupants but the common areas and facilities are shared, townhouses or similar buildings with multi-story units, co-operative housing that operates under a different ownership and governance model in which the residents collectively manage the property, duplexes and triplexes, hotels, motels, dormitories, downtown lofts, a senior living center, a college or university campus, an apartment complex.

Multiple UEs 110 (e.g., 110-1, 110-2, 110-3, 110-4, etc.) are located within the MDU environment 102. The UEs may be owned, operated, controlled by various users across the multiple units of the MDU 102. A household or a user of each unit of the MDU 102 may have one or more UEs. The users in within the same MDU 102 may not share their UEs. However, UEs within one single unit of the MDU 102 may be interconnected through a local network (not illustrated) such as a wireless network or a wired network. The UE 110 is generally used to any devices that are used by the user to access the communications network 105 to receive, stream, play, and present media content from any content sources internal within the MDU 102 and external to the MDU 102 (e.g., from a content provider). Examples of UE 110 include televisions (TV) and smart TVs, set top boxes, satellite set top box, gaming consoles, smartphones, tables, wearables, streaming sticks, smart projectors, virtual reality and augmented reality (VR/AR) devices, integrated receiver decoders, and so on. The UEs 110 may communicate with the MDU gateway device 160 and/or access the communications network 105 through one or more access points 120 (e.g., 120-1, 120-2, 120-3, etc.).

The access points 120 are generally network devices that extend the network coverage within the MDU 102, enable the UEs 110 to connect to the MDU gateway device 160, and enable the UEs 110 to access the communications network 105. In some embodiments, an access point (e.g., 120-1) may be installed within one unit of the MDU 102 and exclusively used by UEs within the unit. Alternatively, an access point may be installed in a common area of the MDU 102 and shared by UEs across various units of the MDU 102.

The MDU gateway device 160 functions as a central hub for the communication of UEs 110 of the individual units within the MDU 102. In some embodiments, the MDU gateway device 160 is installed in the MDU 102 by the MDU administrator (e.g., a property manager). Among other capabilities, the MDU gateway device 160 is configured to receive content from content providers, record the content to generate a shared copy of the content, and delivery the shared copy of content to a UE 110 within the MDU 102 upon request.

The MDU gateway device 160 may be in communication with content providers 180 (i.e., 180-1, 180-2, etc.) through data transmission devices, such as over-the-air (OTA) radio frequency (RF) device 190 or satellite 195. Satellite 195 may be used to transmit content to the MDU gateway device 160 over television and radio broadcasting, as well as for internet access in remote areas where traditional wired connections are not available. On the other hand, the OTA RF device 190 may be used to transmit content to the MDU gateway device 160 over a wireless network, such as Wi-Fi or cellular networks.

Alternatively, in other embodiments, the MDU gateway device 160 may be in connection with a head end (not shown) separate from the MDU gateway device. The head end (e.g., a branded smart box of a content provider, or a smart box designed and provided by a third party) is in communication with the content providers 180 and is configured to receive content from the content providers 180 and further transmit the content to the MDU gateway device 160. In other words, the MDU gateway device 160 may receive content from the content provider 180 via the separate head end.

The MDU gateway device 160 may include one or more origin server 170 (e.g., 170-1, 170-2, 170-3, etc.) configured to stream the content received from the content providers 180. The origin server 170 includes a hardware component used to enable high-quality streaming or content over either a local area network (LAN) or a wide area network (WAN). The origin server may include a specialized processing unit designed to handle streaming traffic with low latency and high throughput. The origin server 170 can be used to support various types of streaming protocols and codecs, including popular protocols such as HTTP Live Streaming (HLS), Real Time Messaging Protocol (RTMP), Multicast IP based Streaming, and Dynamic Adaptive Streaming over HTTP (DASH). The origin server 170 can also support different quality levels and resolutions to accommodate different network conditions and device capabilities.

The router 130 is configured to facilitate communications between the UEs 110 and the MDU gateway device 160, the recording device 150, and the storage device 155 within the MDU 102. The router 130 can be connected to the MDU gateway device 160 either through a wired or wireless connection. Once connected, the router 130 can assign unique IP addresses to each UE 110 or access points 120 within the network, allowing them to communicate with each other and with devices outside the network. The content received by the MDU gateway device 160 may be distributed to the UEs 110 and other devices within the MDU 102 (e.g., the recording device 150) via the router 130 through LAN streaming.

The firewall 140 (also referred to as "network firewall 140") connected to the communications network 105 is configured to monitor and control incoming and outgoing network traffic to prevent unauthorized access or attacks from outside the MDU 102. In some embodiments, the firewall is integrated to or installed on the MDU gateway device 160 that connects the internal network of the MDU 102 to the communications network 105. The firewall 140 may be in a form of a physical hardware device, a software-based firewall running on the MDU gateway device 160, or a combination thereof. In some embodiments, the firewall 140 may also provide additional features such as Quality of Service (QOS) control, which can prioritize network traffic for certain applications to ensure smooth and consistent performance for content streaming and sharing. In some embodiments, the content received by the MDU gateway device 160 is distributed to the UEs 110 and other devices within the MDU 102 (e.g., the recording device 150) via the firewall 140 through WAN streaming.

The recording device 150 is connected to the MDU gateway device 160 via the router 130. The recording device 150 is configured to record the content received by the MDU gateway device 160 and generate a copy of the content. The copy of the content may be stored in a storage device 155. The storage device 155 may be a local device (e.g., 155-1) within the MDU 102 or a cloud storage device (e.g., 155-2) connected to the communications network 105. The copy of the content stored in the storage device 155 is accessible by the UEs 110 via the router 130 (e.g., through LAN streaming) or via the communications network 105 through network streaming. Examples of the recording device 150 include but are not limited to Digital Video Recorder (DVR), Network Video Recorder (NVR), Video On Demand (VOD) server, media server, cloud-based recording service.

In some embodiments, the recording device 150 is a smart edge server located within the MDU 102 and close to the UEs 110. The smart edge server is configured to record contents and stored the recorded contents locally at the edge (i.e., the MDU 102) of the network. Smart edge servers can be used to reduce latency and improve performance for applications that require real-time or near-real-time data processing within the MDU 102.

In some embodiments, the MDU gateway device 160 is in connection with a head end (not shown) separate from the MDU gateway device 160 and is configured to receive content from the content provider 180 via the head end. The recording device 150 may be included in the MDU gateway device 160 or configured as an internal device/function of the MDU gateway device 160.

Figure 2:
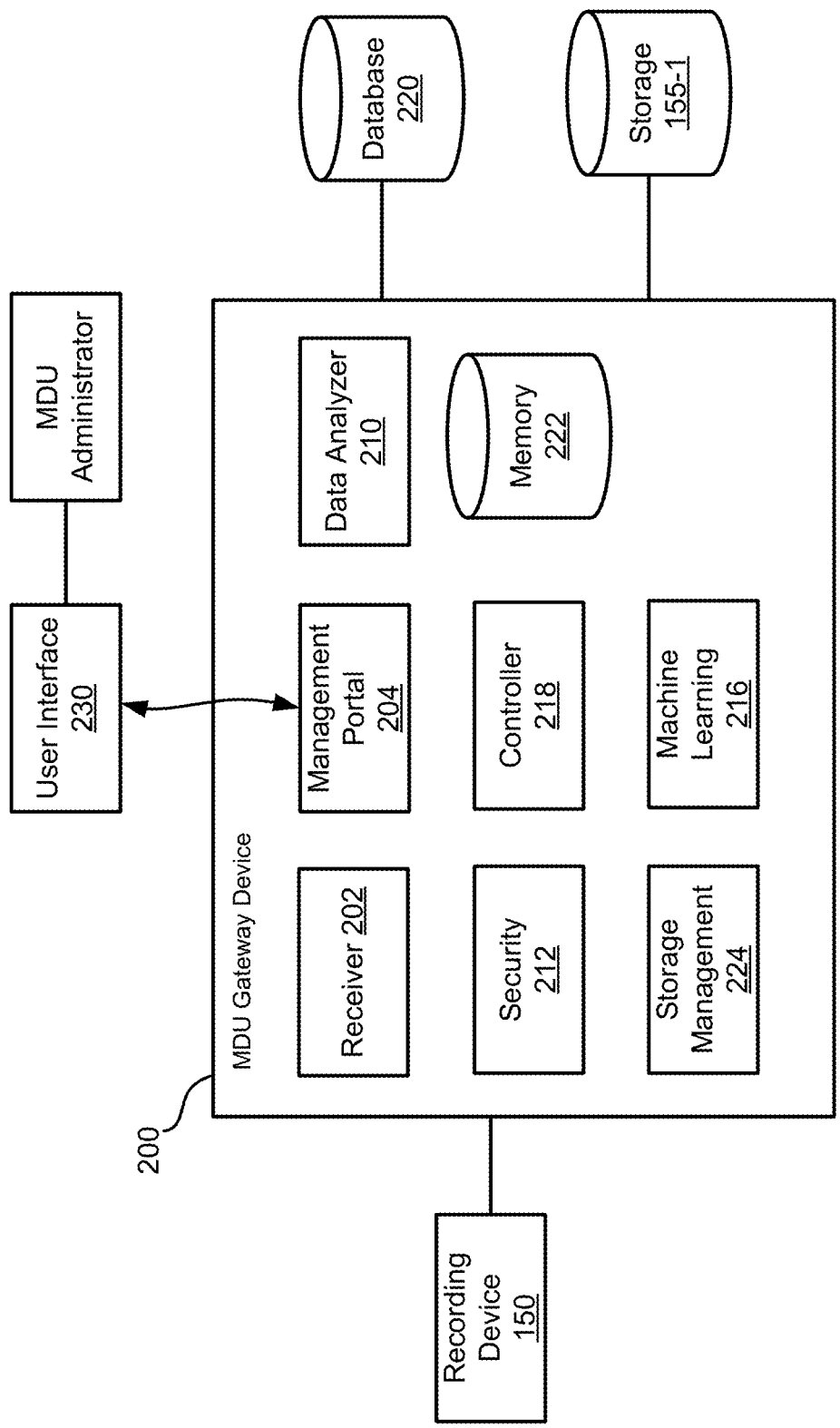
FIG. 2 illustrates a schematic diagram illustrating another example of a communications system according to various embodiments.

FIG. 2 is a schematic diagram illustrating an example of the MDU gateway device 200 according to various embodiments. The MDU gateway device 200 is a representative example of the MDU gateway device 160 shown in FIG. 1. In the illustrated example, the MDU gateway device 200 includes, among other components, a receiver 202, a management portal 204, a data analyzer 210, a security component 212, a machine learning component 216, a controller 218, a database 220, and a memory device 222.

The receiver 202 is configured to receive and process signals from the OTA RF device 190 and the satellite 195, or other sources internal or external to the MDU 102. The receiver 202 and may include a tuner, demodulator, a depacketizer, a demultiplexer, a decoder, an encryption module, and a decryption module, among other components. The receiver 202 may decode the signals received and deliver the content over the network to a specific device (e.g., the recording device 150 or the UE 110) within the MDU 102.

The management portal 204 allows the administrator (e.g., the property manager of the MDU 102) to configure and manage the MDU gateway device 200. The management portal 204 may include a range of tools and features that allow administrators to manage user accounts, network settings, security settings, and other aspects of the network within the MDU 102. For example, administrators may be able to create and manage user accounts, set up and configure network access points, monitor network traffic and bandwidth usage, and configure security settings such as firewalls and intrusion detection systems for the communications system 100 shown in FIG. 1. In some embodiments, the management portal 204 may be a user interface such as a web-based interface that allows the administrator to configure and control the MDU gateway device 200.

The data analyzer 210 is configured to obtain and fetch data (e.g., the process of retrieving data from an internal or external database) in relation to the UEs 110 within the MDU 102, and analyze the data to gain insights and made decisions regarding the content recording and sharing. In some embodiments, the data analyzer 210 is configured to automatically generate a user profile by collecting data related to user information and store the user profile in a database such as the storage device 155-1. The user profile may include user's personal information such as user's name, age, gender, contact information, and other demographic data; user's viewing habits such as information on the user's preferred TV channels, favorite list of channels, programs, genres, or time slots, as well as viewing history and frequency of the user; UE's information such as manufacture specification, brand, model, software version; subscription information such as the user's subscription package, account information, billing details, and payment history; user's interests and preferences such as user's interests, hobbies, preferences, or lifestyle generated from user's viewing history, browsing history, and other information voluntarily provided by the user; user viewing behavior such as data generated from the historical interaction between the UE 110 and the MDU gateway device 160, such as login frequency, navigation patterns, and feedback; user's social connections such as the user's social network, connections, and interactions with other users within the MDU 102. Other information pertaining to the user and UE 110 within the MDU 102 may also be included in the user profile. The user profile may be timely updated when a new user moves into the MDU 102 and a current user moves out of the MDU 102.

In some embodiments, the user profile further includes DVR analytics data related to the users as subscribers to commercial service/content provider such as SLINGTV® or DISH DBS®. For example, the DVR analytics data may include the number of users associated with the MDU 102 who have activated the DVR feature, the amount of time the users spend watching recorded content; the types of shows and channels that are most frequently recorded by the users associated with the MDU 102, the average length of recorded programs watched by the users, the user feedback and ratings for recorded programs, and so on. The DVR analytics data may be used by the MDU gateway device 160 to gain insights on viewing habits and preferences of each individual user and a particular group or class of users within the MDU 102. In some embodiments, users or subscribers may not reside in the MDU, but user data such as the DVR analytics data associated with the users may still be obtained and used to generate the user profile.

In some embodiments, the data analyzer 210 is further configured to classify the users within the MDU 102 to generate one or more user lists, each user list including users having a common viewing habit or shared preference on the content. For example, the user lists or user groups may be generated based at least in part on the age of the user. Users at age over 60 are classified as a senior group; users at age between 24 to 59 are classified as an adult group; users having age between 18 to 24 are classified as student group; and so on. In another group, the user lists may be generated based at least in part on the type of the MDU 102. As mentioned above, the MDU 102 may have a relatively unified tenant profile (e.g., a senior living center or a university dormitory, etc.). Classification of users for this type of the MDU 102 may be relatively easy (e.g., based on the age of the users).

Figure 3B:
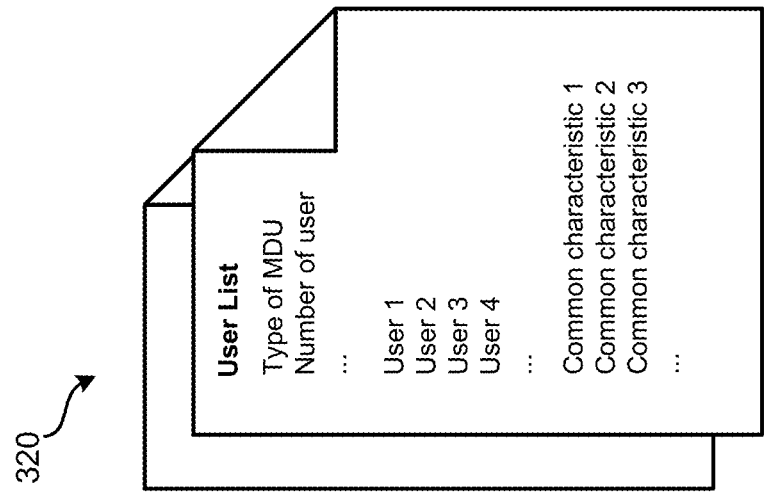
FIG. 3B illustrates an example of a user list according to various embodiments.
Figure 3A:
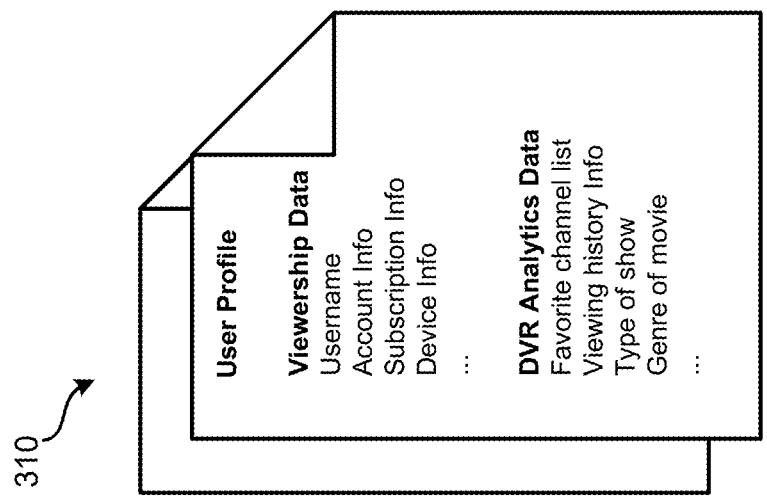
FIG. 3A illustrates an example of a user profile according to various embodiments.

FIG. 3A illustrates an example of a user profile 310. In the illustrated example, the user profile 310 includes viewership data. The viewership data includes the username, user's personal information, user account information, subscription information, the unit information regarding the user in the MDU 102, the information regarding the UE 110 associated with the user or the unit. The viewership data may further include DVR analytics data related to the user, including favorite channel list, viewing history information, type of show watched within a predetermined time period, genre of movies watched within a predetermined time period, number of recordings scheduled by the user, number of recordings completed by the user, number of recordings deleted by the user, amount of storage space used by the user, average length of recordings by the user, time of day when the user schedules most recordings, most commonly recorded shows or channels by the user. Additional information may also be included in the user profile 310.

On the other hand, the MDU 102 may also have a relatively diversified tenant profile (e.g., hotel, residential apartment complex, etc.), and more factors need to be considered in the classification of diversified users. In this scenario, multiple user lists may be generated, each user list corresponding to a common characteristic shared by the users of the user list. Examples of the common characteristic include but are not limited to common age range, common subscription, common ethnicity, common educational background, common habit, common preference on a particular channel or program, common viewing history, etc. The user lists may be further modified and refined, based on other information included in the user profile.

FIG. 3B illustrates an example of a user list 320. In the illustrated example, the user list 320 includes a name of the user list, the type of the MDU 102, the name and personal information of each user on the user list, the common characteristic shared by the users on the user list, the common preference of the user list, and additional information described above.

The data analyzer 210 is configured to identify a target content item to be recorded and shared by the users of the MDU 102. In some embodiments, the data analyzer 210 is configured to generate a recommendation list for each user list. The recommendation list may include a baseline recommendation of one or more target content items to be recorded for sharing among MDU users on a particular user list. The recommendation list may include information regarding the target content item to be recorded, and the target content item may be a particular TV channel or a particular time slot thereof, a particular show, a particular sport, a particular program, or a particular event, recommended by the data analyzer 210 based on the type of the MDU 102 of the user list and the common characteristics shared by the users of the user list. The recommendation list may further include information regarding the start time, end time, estimated time length, streaming bitrate, streaming quality of each target content item as well as the estimated size of the target content item for the group recording.

Figures 3C, 3D:
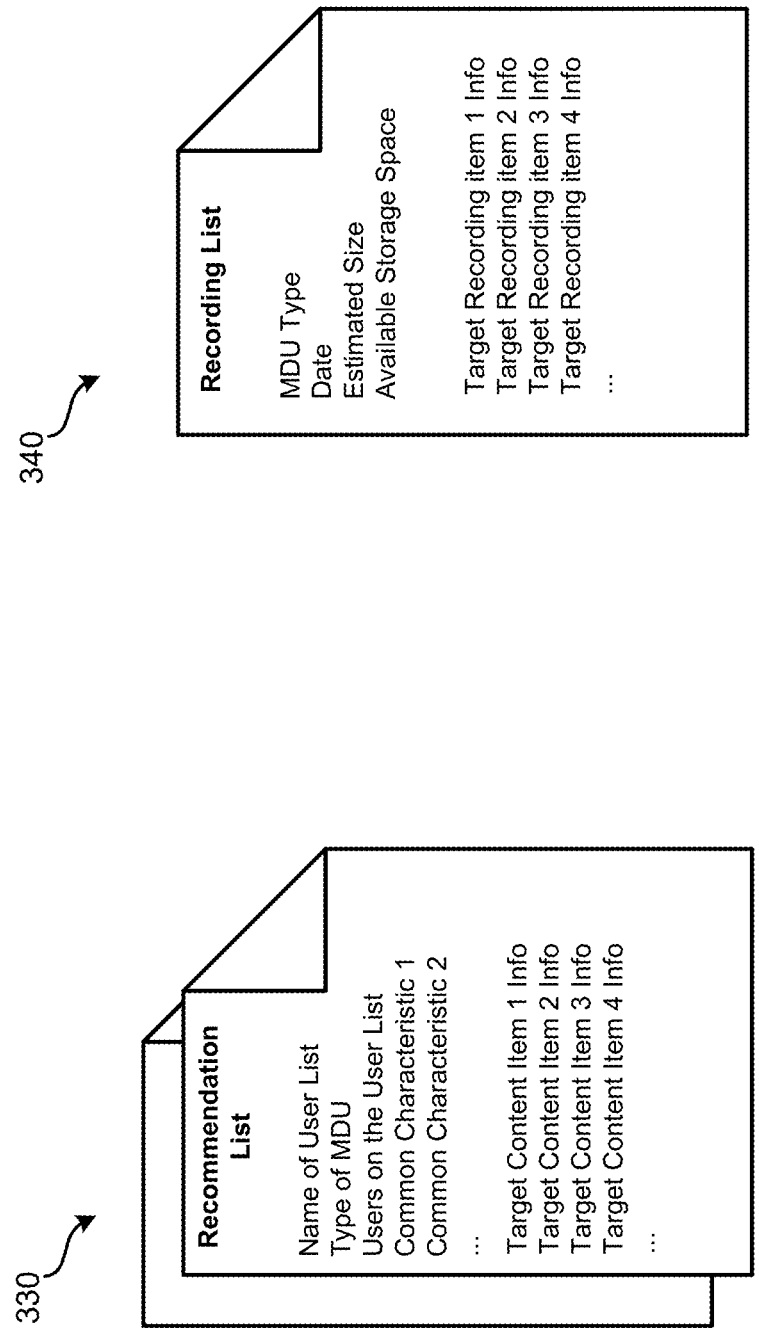
FIG. 3C illustrates an example of a recommendation list according to various embodiments.
FIG. 3D illustrates an example of a recording list according to various embodiments.

FIG. 3C illustrates an example of a recommendation list 330. In the illustrated example, the recommendation list 330 includes multiple target content items (e.g., a first target content item 332-1, a second target content item 332-2, a third target content item 332-3, etc.). The recommendation list further includes information associated with each target content item, such as the information of the user list to which the user is associated, the name or identity of the user, the UEs associated with the user, the name of the target content item, the source of the target content item, the estimated size of the target content item, the estimated time length of the target content item, the estimated start time and end time of the target content item, the popularity of the target content item, etc.

In some embodiments, multiple user lists are generated based on different common characteristics of the users within the MDU 102. The data analyzer 210 may be further configured to prioritize the group lists. The user lists may be prioritized based on a pre-established rule or a machine learning (ML) model. For example, a target content item is selected when the number of users of the user list associated with the target content item exceeds a pre-determined number. As another example, among user lists having the same number of users, the target content item with higher popularity prevails other target content item with lower popularity.

In some embodiments, the data analyzer 210 may be further configured to prioritize multiple target content items on the recommendation list with regard to one or more particular user list according to a pre-established rule. For example, multiple target recordings may be prioritized based on the availability of the storage device, the size of the recording file, the popularity of the shared content, and so on. In some embodiments, the data analyzer 210 may generate a recording list (i.e., a final recording list) that includes the target recording items that are determined for group recording, based on the prioritization result of the multiple target content items on the recommendation list. The final recording list may be included in a command or instruction that is sent to the recording device 150 for the recording device 150 to record the target recording item and generate a shared recording of the target recording item.

Recording files are generated by the recording device 150. The recording device 150 may receive a command to record along with the recording list from the MDU gateway device 160. Recording the target recording item may be automatically triggered according to the recording list to generate a shared recording that includes the content of the target content item. In some embodiments, multiple shared recordings are generated, each shared recording corresponding to a particular target content item included in the recording list. The shared recordings may be stored in the storage device 155-1. The storage device 155-1 may be external to the MDU gateway device 200, or alternatively be an internal component integrated into the MDU gateway device 200.

FIG. 3D illustrates an example of a recording list 340. In the illustrated example, the recording list 340 includes one or more target recording items (e.g., a first target recording item 342-1, a second target recording item 342-2, a third target recording item 342-3, etc.). The target recording items are the final target content items that are selected through the prioritization process as described above. The recording list 340 further includes information associated with each target recording item, such as the information of the user list to which the target recording item is associated, the identities of the users and UEs associated with the target recording item, the file name of the target recording item, the source of the target recording item, the estimated size of the target recording item, the estimated time length of the target recording item, the estimated start time and end time of the target recording item, and so on.

The user profile 310, user list 320, recommendation list 330, and recording list 340 may be stored in the database 220 in connection with the MDU gateway device 200. In addition, the database 220 may also store information regarding the MDU 102 and the MDU administrator, relevant business conditions, regulation, or legal requirement pertaining to content streaming and recording.

The storage management component 224 provides a centralized interface for managing the storage device 155-1, monitoring the availability of the storage device, deleting a shared recording stored in the storage device 155-1 after a pre-determined time. The storage management component 224 may be further used by the MDU administrator to configure the storage device, perform storage device backup and recovery, perform storage device optimization, and manage the storage device.

The security component 212 is responsible for managing the security of the network infrastructure of the MDU 102 and any UEs 110 and devices connected to the MDU gateway device 200 through the network infrastructure. The security component 212 may be used to monitor network traffic and detect potential security threats and take actions to prevent them. The security component 212 may also be used to encrypt a connection between a UE 110 and the MDU gateway device 200 and/or the storage device 155-1, providing an additional layer of security for users who need to access the live streaming content and/or the content of the shared recording stored in the storage device 155-1. The security component 212 may also be used to control who has access to the network and determine the eligibility of the user or the UE 110 to access the shared recordings stored in the storage device 155-1. In addition, the security component 212 may also be used to block unauthorized access to content and/or access to content that is inappropriate, illegal, and harmful.

The machine learning component 216 is used to generate, develop, and train a machine learning model to predict a common characteristic of users of the MDU 102, predict a common watch behavior of a particular group of users, and/or predict a common interest in a target content item shared by the users of the MDU 102, predict a target content item, and prioritize multiple target content items. In some embodiments, a first machine learning model may be used to generate the user list 320. In some embodiments, a second machine learning model may be used to identify a target recording, generate the recommendation list 330 included the target recording. In some embodiments, a third machine learning model may be used to prioritize the multiple target content items and generate a final recording list for group recording.

The machine learning component 216 may receive and collect viewership data and DVR analytics data from the user profile 310, process the received data to train a machine learning model using a supervised learning technique, an unsupervised learning technique, or a combination thereof. The data may be collected over a relatively long period of time to be sufficient to train the machine learning model. The collected data may be processed to extract one or more features that could be used to predict a target content item that can be shared by users. Such features may be further translated into the common characteristics shared by the users on a particular user list 320. The collected data may be further processed by cleaning and formatting, scaling, and normalizing the features. An appropriate machine learning algorithm may be selected, depending on the size of the data to train a machine learning model. Example algorithms include logistic regression, decision trees, or neural networks. The machine learning model may be trained using an appropriate technique such as gradient descent or stochastic gradient descent. The machine learning model may be evaluated and validated during and after training by selected metrics, and adjustments may be made as needed. Once the machine learning model is validated, it can be used to predict a target content item for a shared recording to be shared by users on a particular user list or within the MDU 102. The machine learning model can be used to generate the recommendation list 330 or the shared recordings included therein. In addition, the machine learning model can also be used to prioritize the shared recordings for the same user list or among different user lists. The machine learning component 216 may be used to continuously monitor the performance of the machine learning model and adjust it as needed to improve its accuracy and effectiveness over time, when the user profile 310 or the user list 320 is updated.

The controller 218 is used for controlling various operations within the MDU gateway device 200. The controller 218 may be microprocessor-based. The various components within the MDU gateway device 200 may also be incorporated in software within a controller 218. The memory device 222 receives and stores signals broadcasted to the MDU gateway device 200 and also provides temporary or permanent storage space during data processing. The memory device 222 may be physically within, associated with, or coupled to the MDU gateway device 200. The memory device 222 may include one memory device or a plurality of memory devices. The memory device may be implemented in a hard drive, flash memory or other types of memory.

The MDU gateway device 200 may be controlled by a MDU administrator such as the property manager of the MDU 102 via a user interface 230. In some embodiments, the user interface 230 is provided in a device external to the MDU gateway device 200. Alternatively, the user interface 230 may be integrated to the MDU gateway device 200 as an internal component.

Figure 4:
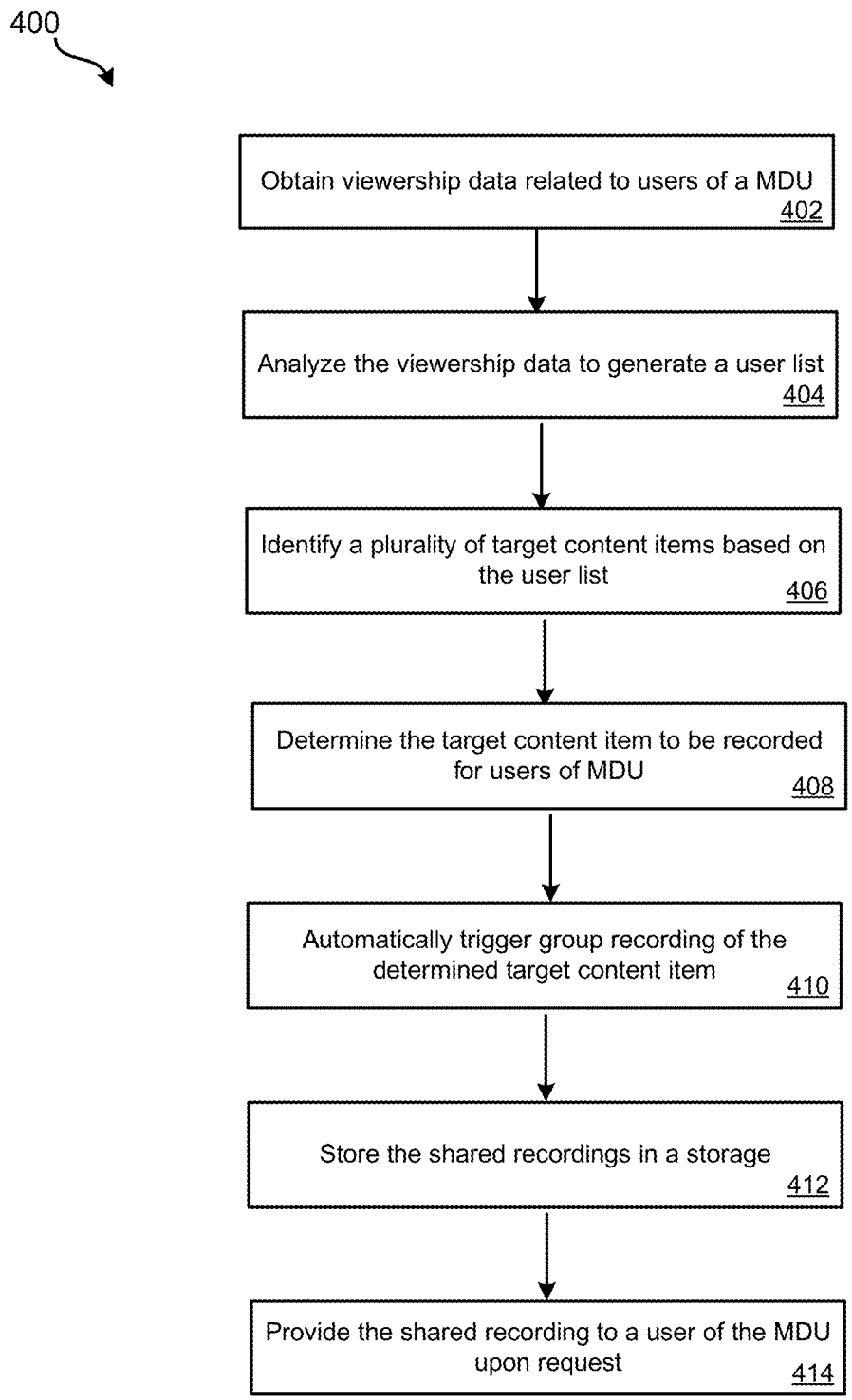
FIG. 4 is a flow diagram illustrating an example method for MDU group recording according to various embodiments.

FIG. 4 is a flow diagram illustrating an example method 400 for MDU group recording, according to various embodiments. The method 400 may be performed by a device or system. The method 400 may be performed by one or more components of the system or device illustrated by FIGS. 1-2, such as one or more components of the system 100 and the MDU gateway device 200. Depending on the implementation, the method 400 may include additional, fewer, or alternative steps performed in various orders or in parallel.

At 402, data related to users of a MDU is obtained and collected, by the receiver of the MDU gateway device. The data may include viewership data and user information related to a user of the MDU, as described above. In some embodiments, multiple user profiles are generated, each user profile including viewership data and DVR analytics data related to a specific user of the MDU.

In some embodiments, the viewership data of the user profile may include the username, user's personal information, user account information, subscription information, the unit information of the MDU, the device or UE information associated with the user or the unit. The DVR analytics data of the user profile may be obtained from commercial service/content providers such as SLINGTV® and may include favorite channel list, viewing history information, type of show watched within a predetermined time period, genre of movies watched within a predetermined time period, number of recordings scheduled by the user, number of recordings completed by the user, number of recordings deleted by the user, amount of storage space used by the user, average length of recordings by the user, time of day when the user schedules most recordings, most commonly recorded shows or channels by the user.

At 404, the obtained viewership data is analyzed, by the data analyzer of the MDU gateway device. In some embodiments, one or more common characteristics are extracted based on the viewership data and user information of the users associated with the MDU. The common characteristic may be a common viewing habit or shared preference on content among users. In some embodiments, the users within the MDU are classified based on from a content provider. In some embodiments, one or more user lists (or user groups) are generated, each user list including a group of users having a common characteristic and or associated with a particular class. In some embodiments, multiple user lists are generated, and each user list corresponds to a particular characteristic shared by the uses on that user list. In some embodiments, the user list includes a name of the user list, a type of the MDU, name and personal information of each user on the user list, a common characteristic shared by the users on the user list, a common preference on content, and additional information.

At 406, a target content item to be recorded for users associated with the MDU is identified for a user list, by the data analyzer of the MDU gateway device. Multiple factors may be considered, including but not limited to the size of the user list (i.e., the total number of users included in the user list), the common characteristics, shared preference and viewing habit, type of MDU, estimated popularity of the content, estimated size of the content, and so on. In some embodiments, a machine learning model is trained and used to identify the targe content item for recording. In some embodiments, a recommendation list is generated. The recommendation list includes multiple target content items to be recorded (i.e., target recordings) and shared by multiple users of a user list.

At 408, one or more target content items are determined to be recorded for the users of MDU, by the MDU gateway device. The target content items included in the user lists are prioritized, based at least on the availability of the storage space, the commonality of the target content item among the users, the popularity of the target content items, and the estimated size of the target content items. In some embodiments, the availability of the storage space and the size of the target content items can be calculated. In some embodiments, a pre-established rule may be satisfied to ensure that the shared recordings based on the target content items to be stored in the storage will not cause the total usage of space to exceed a threshold level. In some embodiments, a final recording list is generated from the prioritization. The final recording list include the target content items (i.e., the target recording item) that are selected from the recommendation list through the prioritization process. The recording list further includes information associated with each target recording item, such as the information of the user list to which the target recording item is associated, the identities of users and UEs associated with the target recording item, the file name of the target recording item, the source of the target recording item, the estimated size of the target recording item, the estimated time length of the target recording item, the estimated start time and end time of the target recording item, etc.

At 410, group recording of the determined target content item is automatically triggered to record the target content and generate a shared recording, by the recording device. In some embodiments, a command is generated by the MDU gateway device, the command including an instruction along with the recording list. The command is sent to the recording device to cause the recording device to record the target content item automatically once an event identified in the instruction triggers the group recording. For example, the target content item may be a show scheduled to be broadcasted in a particular time slot with a known start time. Automatic recording will be triggered at the start time without human intervention. The recording will be automatically terminated at the end time of the show to generate the shared recording.

At 412, the shared recordings are automatically stored in the storage device. The storage device may be managed by the storage management component of the MDU gateway device. In some embodiments, the total usage and availability of the storage device is monitored. The shared recordings may be managed to remain stored in the storage for a pre-determined time (e.g., 1 day, 1 week, or 1 month). The shared recordings may be deleted to make available storage space after a period of time. In some embodiments, access to the shared recordings by the users of the MDU is monitored. If the shared recording is rarely accessed or viewed for a period of time (e.g., less than three times for a week), the shared recording will be automatically deleted. In some embodiments, the shared recordings stored on the storage may not be shared, copied, and circulated by users outside of the MDU.

At 414, the shared recording is provided to a user of the MDU upon request. In some embodiments, a user request for access to a shared recording is received by the MDU gateway device. A check is performed to verify that the requested recording is stored and available in the storage. A security check may be performed to ensure that the user is authenticated or authorized to access the content of the shared recording. Satisfaction of additional rules (e.g., subscription, legal, and regulatory requirements, contractual agreements) may also be verified as a part of the security check. The shared recording is provided to the user and presented on a UE on which the user may view the content of the shared recording.

In some embodiments, a catalog of the existing shared recordings (i.e., the recorded items) stored in the storage is generated by the MDU gateway device. The catalog may include information (e.g., title page, preview, etc.) of each recorded item. Users of the MDU may browse the catalog and select one or more recorded item of interest and request for playback. For example, a guest of a hotel may have immediate access to already recorded items of a catalog after the guest checks in a hotel room. In contrast, with traditional DVR, the guest may not have access to the already record items generated by group recording and may only access and record live programs.

It should be noted that using shared copy of the recorded content for users in MDU may be limited by the contractual agreement with the content provide and the MDU. Some content providers may restrict the MDU from using shared copies of recorded content. For example, if there are 100 users, then 100 unique copies of the same content are required. Thus, a pre-approval by the content provider may be needed prior to group recording and content sharing.

In some embodiments, usage of the shared recordings by the users of the MDU is tracked. The usage data may include a total number of accesses to the shared recording over a period of time, a total number of users viewing the shared recording over a period of time, an average time length of the shared recording viewed by the users, and so on. The usage data may be used to train a machine learning model, which will be described in more details below with reference to FIG. 5.

Figure 5:
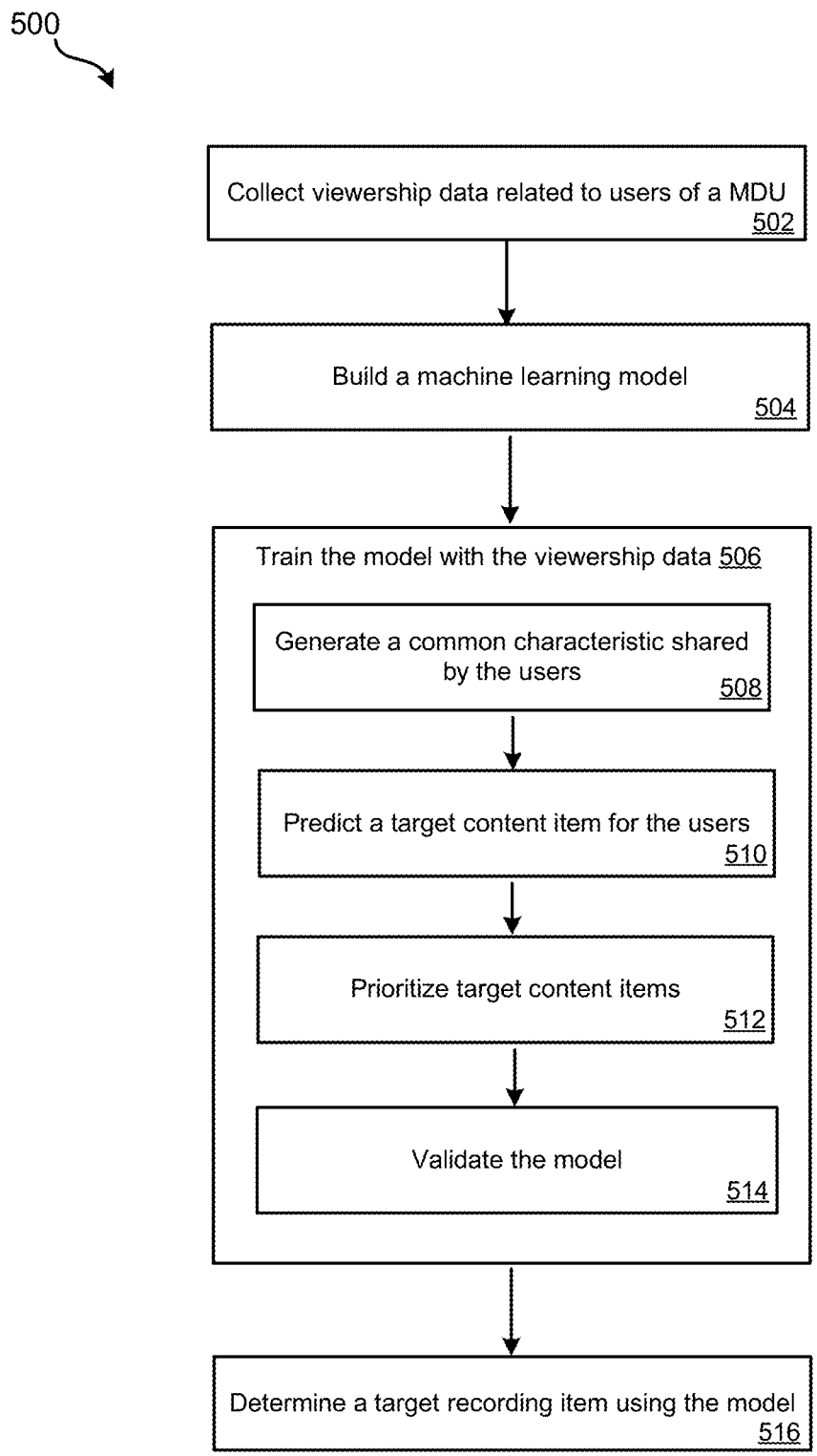
FIG. 5 is a flow diagram illustrating another example method for MDU group recording, according to various embodiments.

FIG. 5 is a flow diagram illustrating another example method 500 for MDU group recording, according to various embodiments. The method 500 may be performed by a device or system. The method 500 may be performed by one or more components of the system or device illustrated by FIGS. 1-2, such as one or more components of the system 100 and the MDU gateway device 200. The method 500 or any step/operation thereof may be combined with other methods of any step/operation thereof in any suitable manner. Depending on the implementation, the method 500 may include additional, fewer, or alternative steps performed in various orders or in parallel.

The method 500 may be used to generate, develop, and train a machine model used for group recording for MDU users. At 502, data related to users of a MDU is collected. The data includes viewership data, DVR analytics data, and data related to past shared recordings are collected. The data includes viewership data and the DVR analytics data may be retrieved from user profiles previously established and stored in a database. The data related to past shared recordings may further include the real-world usage data of past shared recordings obtained by tracking the shared recordings. The usage data may include a total number of access to the shared recording over a period of time, a total number of users viewing the shared recording over a period of time, an average time length of the shared recording viewed by the users, frequency of access to a particular shared recording during a time period of time, the total number of shared recordings, the total size of the shared recordings, the level of usage of the storage over the period of time, and so on. The data may be divided into a training subset and a validation subset. The training subset is used for training the machine learning model, and the validation subset is used to evaluate and validate the machine learning model.

At 504, a machine learning model is built. At 506, the machine learning model is trained with the training subset of the viewership data. In some embodiments, operation 504 may further include operations 508-514. At 508, one or more features are extracted from the collected data, and one or more common characteristics shared by multiple users are generated based on the extracted features. The common characteristics may be used to generate one or more user list. Each user list may correspond to one or more common characteristics shared by the users included in the user list.

At 510, a target content item is predicted based on the common characteristic of the user list. The target content item represents a common interest or preference shared by the users included in the user list. The predicted target content item may be included in a recommendation list corresponding to the user list. Multiple recommendation lists may be generated, each recommendation list corresponding to a particular user list.

At 512, the target content items from multiple recommendation lists may be prioritized, as a part of training the machine learning model. The prioritization may be performed by multiple factors including but not limited to the popularity of all the target content items, the predicted or estimated frequency of access by the users of the MDU, the size of the user list (i.e., the total number of users) to which the target content item corresponds, the relevance of type of MDU to the common characteristics of the users in the user list, the size of the target content item, the availability of the storage space, and so on. A final recording list may be generated from the prioritization to include target recording items to be recorded.

At 514, the machine learning model is evaluated and validated using the validation subset of the collected data. The performance of the machine learning model, particularly the accuracy of the prediction of and prioritization target content items may be improved by adjusting the hyperparameters of the model, extracting new features, tuning regularization, or modifying the model architecture of the machine learning model. In some embodiments, separate machine models are developed and trained for predicting the target content and prioritizing the target content items, respectively.

At 516, the trained machine learning models are used to determine one or more target recording items in a real case. The machine learning model may be used in a similar manner as the training process. For example, the machine learning model may be used to extract a feature from the collected data related to users of a MDU, generate a common characteristic based on the extracted feature, predict a target content item based on the common characteristic, and prioritize multiple target content items to determine the target recording items based on the prioritization.

Figure 6:
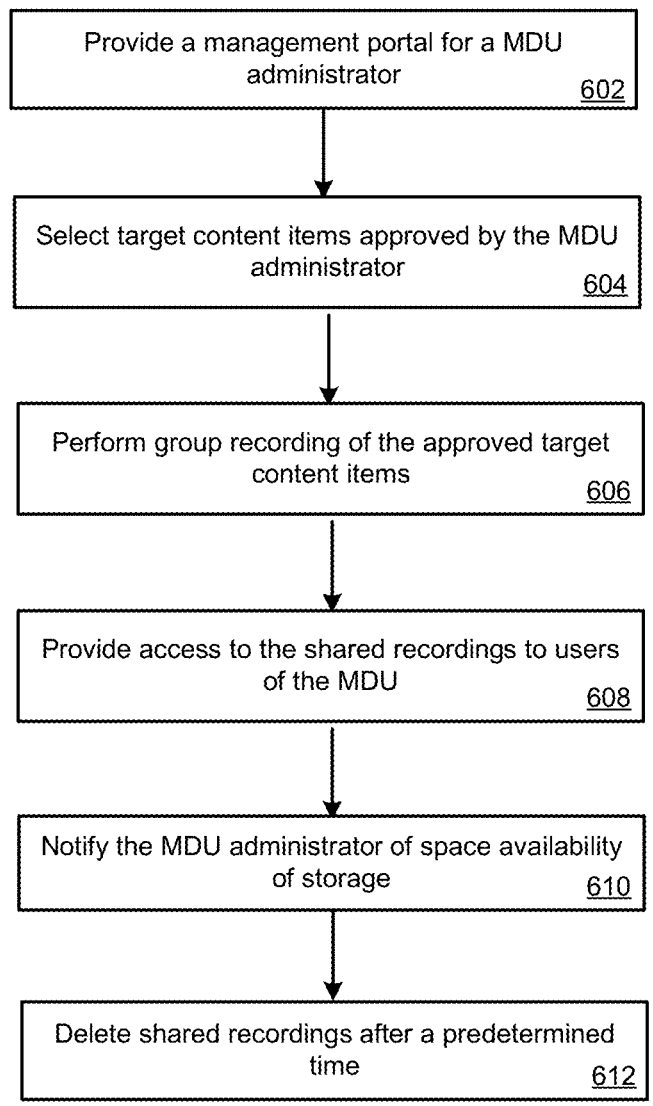
FIG. 6 is a flow diagram illustrating yet another example method for MDU group recording, according to various embodiments.

FIG. 6 is a flow diagram illustrating another example method 600 for MDU group recording, according to various embodiments. The method 600 may be performed by a device or system. The method 600 may be performed by one or more components of the system or device illustrated by FIGS. 1-2, such as one or more components of the system 100 and the MDU gateway device 200. The method 600 or any step/operation thereof may be combined with other methods of any step/operation thereof in any suitable manner. Depending on the implementation, the method 600 may include additional, fewer, or alternative steps performed in various orders or in parallel.

The method 600 may involve interaction between the MDU gateway device and an MDU administrator. At 602, a management portal is provided to an MDU administrator to control the MDU gateway device and access and manage any data, user profile, user list, recommendation list, and recording list generated for group recording. The management portal may be in a form of a web interface. The MDU administrator may be a property manager of the MDU or an operator of the content/service provider.

At 604, target content items approved by the MDU administrator are selected by the MDU gateway device. In some embodiments, the data, user profile, user list, recommendation list, and recording list are reviewed by the MDU administrator. A final decision on the target recording items may be made by the MDU administrator. The MDU administrator may approve the recording list, modify the recording list, add or remove shared recording items recommended by the MDU gateway device, choose a list of TV channels, select a particular time slot of the TV channel, reprioritize the shared recording items, set a lifetime of a shared recording stored in the storage, set or modify the lifetime of a shared recording stored in the storage, delete a shared recording in the storage, organize the stored recordings in the storage, perform storage cleanup, and so on. It is noted that the MDU administrator may have discretion in determining the final target recording items. An instruction may be generated and sent to the MDU gateway device to execute group recording.

At 606, group recording is performed automatically according to the instruction to record the target content items that are approved by the MDU administrator, generate shared recordings, and store the shared recordings in the storage. At 608, Access to the shared recordings is provided to a user of the MDU upon request. At 610, a notification may be sent to the MDU administrator once the shared recordings are generated. In some embodiments, the MDU administrator may be notified of an issue of group recording (e.g., an unexpected change to the target content item, the usage of space of the storage reaching the limit, etc.). A report of the group recording may also be generated and sent to the MDU administrator. At 612, the shared recordings stored in the storage may be deleted after a predetermined period of time. A request for approval may be sent to the MDU administrator prior to deleting the shared recordings.

Table 1 shows an example of storage comparison between a single copy of shared recording for all users within an MDU and multiple unique copies for each user within an MDU. It should be noted that the example shown in Table 1 is for illustrative purpose only, and the calculation may vary depending upon factors such as bitrate of content, quality of streaming, types of content stored, etc. Apparently, a single copy of a shared recording could significantly reduce the usage of storage, particularly when the number of users of an MDU is large (e.g., over 250). Accordingly, the group recording methods described herein may provide an advantageous solution to DVR of MDUs having a large number of users. For example, a hotel typically has a large number of guests moving in and out on a daily base. Using group recording as described herein, there is no need to manage the individual DVR and delete individual recordings after the guest checks out, which significantly saves storage space and improves the overall efficiency of DVR management.

TABLE 1

Example of storage calculation and comparison.
Calculation Table (1 and 2 Mbps Video content; 80 Kbps audio content; and DASH & HLS content types)

| Number of Users | Storage (10 hours per user) | | Storage (20 hours per user) | | Storage (50 hours per user) | |
|---|---|---|---|---|---|---|
| | Single copy of shared recording | Unique copies for each user | Single copy of shared recording | Unique copies for each user | Single copy of shared recording | Unique copies for each user |
| 1 | 27.77 GB | 27.77 GB | 55.54 GB | 55.54 GB | 138.86 GB | 138.86 GB |
| 250 | 27.77 GB | 6.78 TB | 55.54 GB | 13.56 TB | 138.86 GB | 27.12 TB |
| 500 | 27.77 GB | 13.56 TB | 55.54 GB | 27.12 TB | 138.86 GB | 40.68 TB |
| 1,000 | 27.77 GB | 27.12 TB | 55.54 GB | 40.68 TB | 138.86 GB | 54.24 TB |
| 1,500 | 27.77 GB | 40.68 TB | 55.54 GB | 54.24 TB | 138.86 GB | 108.48 TB |
| 2,000 | 27.77 GB | 54.24 TB | 55.54 GB | 108.48 TB | 138.86 GB | 271.22 TB |

Figure 7:
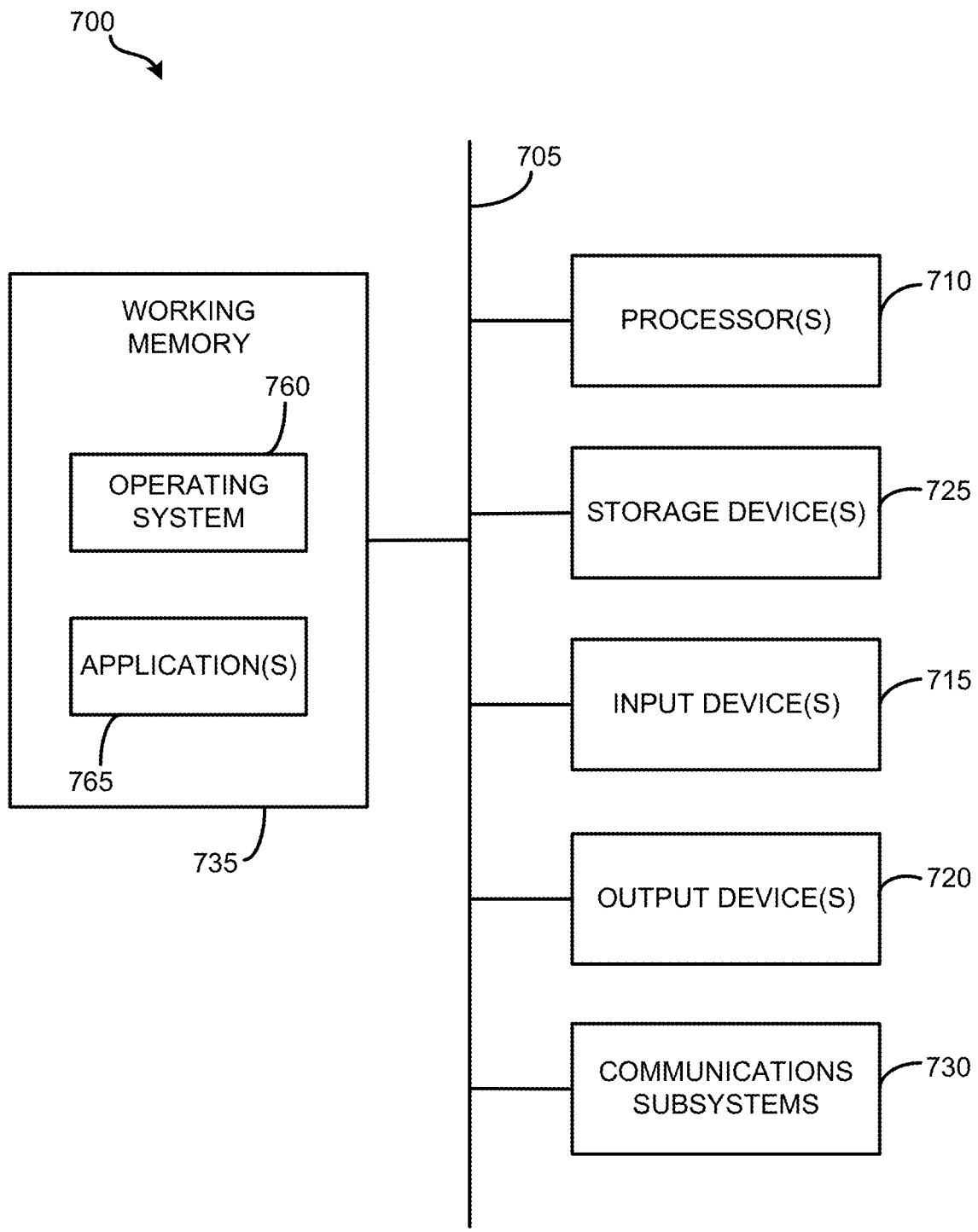
FIG. 7 is a schematic diagram illustrating an embodiment of a computer system according to various embodiments.

FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

While the present disclosure is made with respect to example SLINGTV® broadcast services and systems, it should be understood that many other content delivery and recording systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multichannel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present disclosure.

Further, while the following disclosure is made with respect to the recording of content (e.g., television (TV), movies, music videos, etc.), it should be understood that the systems and methods disclosed herein could also be used for of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method, comprising:
obtaining viewership data related to users of a multiple-dwelling unit (MDU);
processing the viewership data to generate at least one user list, the at least one user list including user identities of a plurality of users of the MDU and one or more common characteristics shared by the plurality of users;
identifying at least one target content item, based on the one or more common characteristics for the at least one user list;
determining at least one target recording item for group recording, based on the at least one target content item;
automatically performing group recording of the at least one target recording item to correspondingly generate at least one shared recording;
storing a copy of each shared recording in a storage device;
providing access to content of the shared recording to a user of the MDU upon request by the user; and
tracking usage data of the shared recording by the users of the MDU, the usage data including a total number of accesses to the shared recording by the users of the MDU over a period of time, a total number of users viewing the shared recording over a period of time, and an average time length of the shared recording viewed by the users.

2. The method of claim 1, further comprising:
generating a plurality of user profiles, each user profile including the viewership data related to one of the users of the MDU.

3. The method of claim 2, wherein the viewership data related to each user further includes DVR analytics data related to the user, wherein the DVR analytics data includes a list of favorite contents of the user, viewing history information related to the user, number of recordings scheduled by the user, number of recordings completed by the user, number of recordings deleted by the user, amount of storage space used by the user, average length of recordings by the user, time of day when the user schedules most recordings, type of the recorded contents by the user.

4. The method of claim 1, further comprising:
generating a recommendation list for each user list, the recommendation list including the identified target content item.

5. The method of claim 1, further comprising:
identifying a plurality of target content items including the at least one target content item; and
prioritizing the plurality of identified target content items based on at least one of:
popularity of each target content item among the users of the MDU, estimated size of each target content item, a total number of the users included in the corresponding user list, and space availability of the storage,
wherein the at least one target content item is determined based on the prioritization.

6. The method of claim 1, further comprising:
generating a recording list for the MDU, the recording list including the determined target recording item.

7. The method of claim 1, further comprising providing the identified target content item to an MDU administrator, wherein the target recording item is determined by the MDU administrator.

8. The method of claim 1, further comprising:
deleting the shared recording after the shared recording is stored in the storage device for a pre-determined time.

9. The method of claim 1, wherein the at least one target recording item is determined using a machine learning model.

10. The method of claim 1, further comprising:
generating a catalog of the shared recordings stored in the storage, the catalog being accessible by a user of the MDU.

11. A system comprising:
one or more processors; and
a computer-readable storage media storing computer-executable instructions that, when executed by the one or more processors, cause the system to:
obtain viewership data related to users of a multiple-dwelling unit (MDU);
process the viewership data to generate at least one user list, the at least one user list including user identities of a plurality of users of the MDU and one or more common characteristics shared by the plurality of users;
identify at least one target content item, based on the one or more common characteristics for the at least one user list;
determine at least one target recording item for group recording, based on the at least one target content item;
automatically perform group recording of the at least one target recording item to correspondingly generate at least one shared recording;
storing a copy of each shared recording in a storage device;
providing access to content of the shared recording to a user of the MDU upon request by the user; and
track usage data of the shared recording by the users of the MDU, the usage data including a total number of accesses to the shared recording by the users of the MDU over a period of time, a total number of users viewing the shared recording over a period of time, and an average time length of the shared recording viewed by the users.

12. The system of claim 11, wherein, when executed by one or more processors, the computer-executable instructions further cause the system to:
generate a plurality of user profiles, each user profile including the viewership data related to one of the users of the MDU.

13. The system of claim 11, wherein, when executed by one or more processors, the computer-executable instructions further cause the system to:
generate a recommendation list for each user list, the recommendation list including the identified target content item.

14. The system of claim 11, wherein, when executed by one or more processors, the computer-executable instructions further cause the system to:
generate a recording list for the MDU, the recording list including the determined target recording item.

15. The system of claim 11, wherein, when executed by one or more processors, the computer-executable instructions further cause the system to:
provide the identified target content item to an MDU administrator, wherein the target recording item is determined by the MDU administrator.

16. The system of claim 11, wherein, when executed by one or more processors, the computer-executable instructions further cause the system to:
delete the shared recording after the shared recording is stored in the storage device for a pre-determined time.

17. The system of claim 11, wherein, when executed by one or more processors, the computer-executable instructions further cause the system to:
generate a catalog of the shared recordings stored in the storage, the catalog being accessible by a user of the MDU.

18. The system of claim 11, wherein, when executed by one or more processors, the computer-executable instructions further cause the system to:
identify a plurality of target content items including the at least one target content item; and
prioritize the plurality of identified target content items to determine the at least one target content item, based on at least one of: popularity of each target content item among the users of the MDU, estimated size of each target content item, a total number of the users included in the corresponding user list, and space availability of the storage.

19. The system of claim 11, wherein, when executed by one or more processors, the computer-executable instructions further cause the system to:
provide the identified target content item to an MDU administrator, wherein the target recording item is determined by the MDU administrator.

20. The system of claim 11, wherein, when executed by one or more processors, the computer-executable instructions further cause the system to:
delete the shared recording after the shared recording is stored in the storage device for a pre-determined time.

* * * * *